J. M. BAKER.
TURN TABLE.
APPLICATION FILED FEB. 21, 1910.
968,229.
Patented Aug. 23, 1910.
2 SHEETS—SHEET 1.
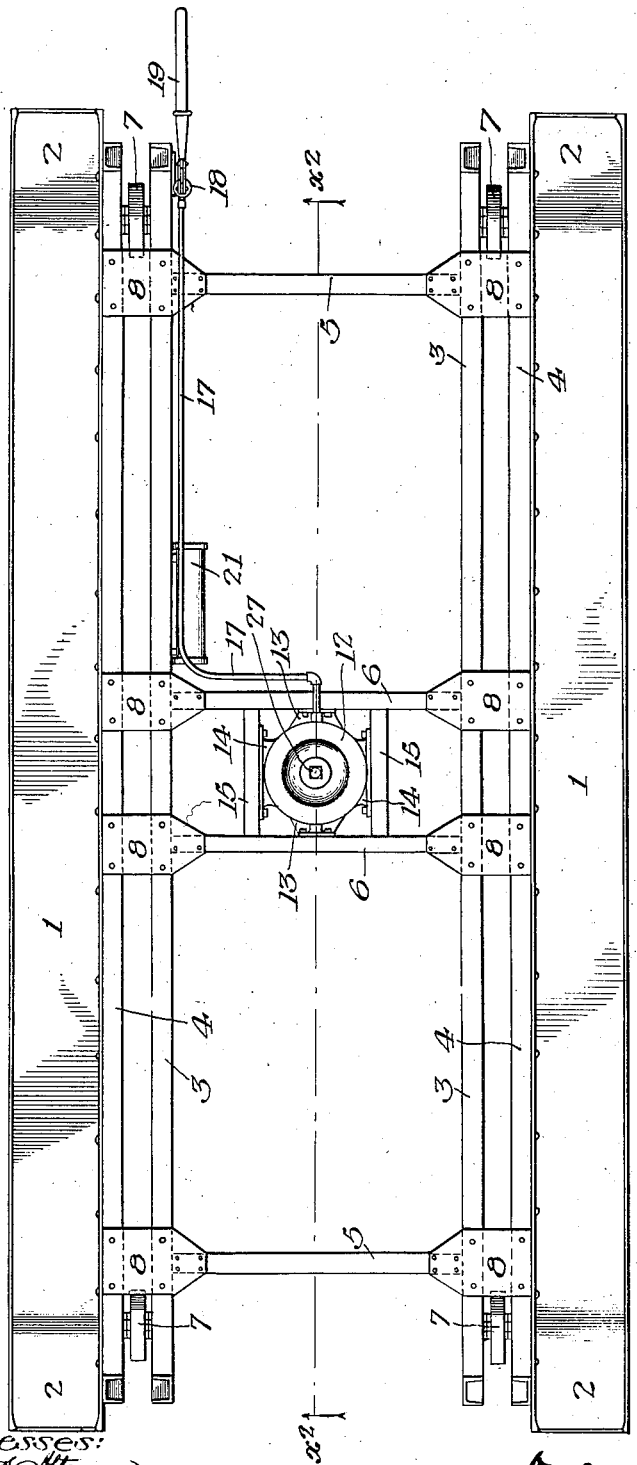
Inventor.
Jean M. Baker.

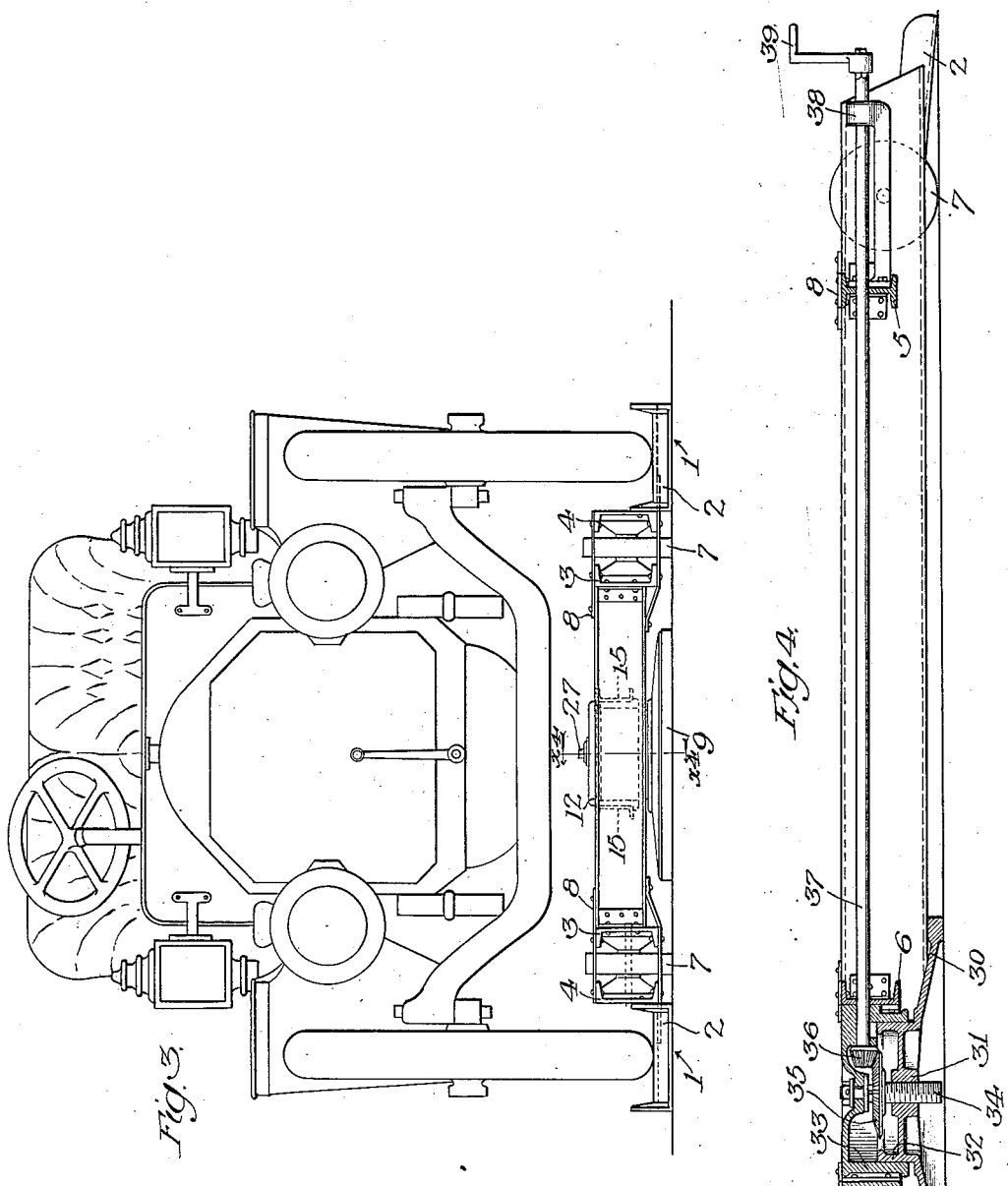

UNITED STATES PATENT OFFICE.

JEAN M. BAKER, OF LOS ANGELES, CALIFORNIA.

TURN-TABLE.

968,229.  Specification of Letters Patent.  Patented Aug. 23, 1910.

Application filed February 21, 1910. Serial No. 545,220.

*To all whom it may concern:*

Be it known that I, JEAN M. BAKER, a citizen of the United States, residing at Los Angeles, in the county of Los Angeles and State of California, have invented a new and useful Turn-Table, of which the following is a specification.

This invention relates to automobile turn-tables especially adapted for use in garages, and the main object of the invention is to provide a turn-table whereby the space in the garage is economized to the fullest extent and no pit is required for the turn-table, the turn-table being capable of traveling bodily to carry the automobile along an aisle or passageway between two rows of stalls until the automobile is in front of its stall when the turn-table may be stopped and then turned one-quarter way around to bring the automobile into proper position for being moved into the stall. Thus with such a turn-table the passageway need be no wider than the diameter of the circle described by the turn-table in turning, while the stalls may, of course, be arranged as close together side by side as advisable to allow sufficient space for the width of the automobiles when in the stalls.

The present invention, while possessing the same advantages and objects, embodies a construction of turn-table which is more economical than the construction shown in the other application referred to wherein the turn-table is suspended by and adapted to travel along an overhead structure. In the present application the overhead structure is eliminated and the turn-table is provided with its own wheels adapted to travel on the floor of the garage.

In the accompanying drawings which illustrate two forms of the invention: Figure 1 is a plan view of one form of the turn-table. Fig. 2 is a section on line $x^2$—$x^2$ Fig. 1. Fig. 3 is a front elevation of another form of turn-table showing the automobile in position. Fig. 4 is a vertical, longitudinal section on line $x^4$—$x^4$ Fig. 3.

In the form shown in Figs. 1 and 2, 1 designates the automobile supporting rails of the turntable, the ends 2 of which are bent down to form inclined approaches at the floor line. On the inner side of each rail 2 is a pair of channel bars 3 and 4, the rail 2 being riveted to the channel bar 4 and the two pairs of channel bars being connected by cross bars 5 and 6. At each end of each pair of channel bars is a wheel 7 which travels on the floor except when lifted free from the floor, as will be described. The cross bars 5 are firmly braced and secured to the channel bars 3 by plates 8 which also serve to connect the two channel bars 3 and 4 together.

At the center of the turn-table is a pedestal 9 having a central vertically-projecting stationary piston 10 which has a conical depending central portion 11. Slidably fitting over the piston 10 is a cylinder 12 which is secured by brackets 13 to the cross bars 6 and by brackets 14 to cross bars 15 which extend between the cross bars 6. Cylinder 12 also has a depending conical central portion 16 which nests within the conical central portion 11 of the piston and by forcing fluid into the cylinder 12, the cylinder, together with all parts of the turn-table except the pedestal and piston, will be lifted. Fluid may be forced into the cylinder 12 through a pipe 17 which extends to one end of the turn-table and communicates with a pump 18, which may be operated by a hand lever 19. A pipe 20 extends from the pump to a supply tank 21 supported on one of the channel bars 17.

22 and 23 are pump valves, valve 22 being arranged between the pipe 20 and pump and permitting fluid to pass from the supply cylinder to the pump, but preventing its passage in the opposite direction; while valve 23 permits fluid to pass from the pump through the pipe 17 and thence to the cylinder 12 and prevents it from passing back through pipe 17 into the pump. A release valve 24 is provided in a branch pipe 25 which extends around the pump from pipe 17 to pipe 20 and should be closed while the pump is being operated to force fluid into the cylinder 12 to raise the turn-table. When it is desired to lower the turn-table, the valve 24 is opened which permits the fluid to pass backward from pipe 17 into the pipe 20 and thence back to the supply cylinder 21. Thus by operating the pump fluid may be forced into the cylinder 12 to lift the turn-table together with the automobile on it, so that the wheels 7 are clear of the floor and when so lifted the turn-table is supported by the pedestal 9 which rests upon the floor while the cylinder 12 is supported by the fluid within it, which in turn rests upon the piston, and when in this position the turn-table may be turned in either direction, the cylinder revolving around the stationary piston, the only friction being that between the side walls of the piston cylinder, the fluid between the heads of the piston and cylinder obviating friction at those points.

After the turn-table has been lowered so that the wheels rest upon the floor and it is desired to move the turn-table along the floor, it is obvious that the pedestal 9 would drag upon the floor unless it were lifted and for this purpose I provide the coil spring 26, the lower end of which presses against the outer side of the cylinder head 12, while the upper end of the spring presses against a nut 27 on the upper end of a bolt 28 which extends freely through the cylinder head and is screwed to the piston. Thus the pressure of the spring 26 acts upwardly on the bolt 28 tending to lift the latter together with the pedestal. The pedestal is thus automatically lifted clear of the floor whenever the fluid has been allowed to escape from the cylinder 12. As soon, however, as the fluid is forced into the cylinder 12, its first action is to depress the pedestal 9 into contact with the floor before any lifting action of the turn-table occurs.

In the form shown in Figs. 3 and 4, the construction is similar to the preceding form, except that in place of the hydraulic mechanism for lifting the turn-table, I employ a screw and gear mechanism. In this form, 30 designates the pedestal which is formed with a central nut 31 and an annular flange 32 which is slidably guided in a cylindrical center casting 33 which corresponds to the cylinder 12 of the preceding form and to which the framework of the automobile is attached and is supported thereby. Rotatably mounted in the casting 33 and depending therefrom is a screw 34 which passes through the nut 31 and above the nut is provided with a bevel gear 35 which is driven by a bevel pinion 36 on the end of a shaft 37, the inner end of which is journaled in the casting 33, the outer end of the shaft 37 being journaled in a bracket 38. A crank 39 is provided on the end of the shaft 37 for turning the latter and by rotating the shaft 37 in either direction, the screw 34 will be moved up or down accordingly in the nut 31, thereby raising or lowering the turn-table. When the wheels 7 rest upon the floor, the pedestal 30 may be lifted free from the floor by a slight turn of the shaft 37.

What I claim is:

1. A turn-table comprising a vehicle support onto which the vehicle to be turned may be driven, wheels journaled on said support to enable the support to travel longitudinally along the floor, a pedestal adapted to rest on the floor, said vehicle support being revoluble with respect to the pedestal, and means for moving said vehicle support vertically on said pedestal.

2. A turn-table comprising a vehicle support onto which the vehicle to be turned may be driven, wheels journaled on said support to enable the support to travel longitudinally along the floor, a pedestal adapted to rest on the floor, said vehicle support being revoluble with respect to the pedestal, means for moving said vehicle support vertically on said pedestal, and means for lifting said pedestal clear of the floor when said wheels rest on the floor.

3. A turn-table comprising a vehicle support, a pedestal at the center of said vehicle support and provided with a vertical piston, a cylinder supporting the vehicle support and nesting with said piston, wheels for carrying the vehicle support longitudinally on the floor, and means for controlling the admission and exhaust of fluid to and from the cylinder.

4. A turn-table comprising a vehicle support, wheels mounted thereon to permit the vehicle support to travel along the floor, and means for lifting said support and wheels clear of the floor comprising a central pedestal provided with a piston, a cylinder nested with said piston and supporting the vehicle support, a storage cylinder on said vehicle support, a pump at one end of the vehicle support, means for operating said pump, and means for conveying fluid between said storage cylinder and pump and between said pump and first named cylinder.

5. A turn-table comprising a vehicle support, a pedestal provided with a piston, a cylinder nested with the piston and supporting the vehicle support, said cylinder being revoluble on the piston, means for admitting fluid to and from the cylinder, and means for automatically lifting said pedestal from the floor when the fluid is allowed to exhaust from the cylinder.

6. A turn-table comprising a vehicle support, a pedestal provided with a piston, a cylinder nested with the piston and supporting the vehicle support, said cylinder being revoluble on the piston, means for admitting fluid to and from the cylinder, and means for automatically lifting said pedestal from the floor when the fluid is allowed to exhaust from the cylinder, said last means comprising a bolt attached to the piston and extending through the head of said cylinder, a head on the bolt, and a compression spring between said bolt head and the head of the cylinder.

In testimony whereof, I have hereunto set my hand at Los Angeles, California, this 27th day of January 1910.

JEAN M. BAKER.

In presence of—
 ANDREW H. CLIMIE,
 MILO A. BAKER.